Figure 1:
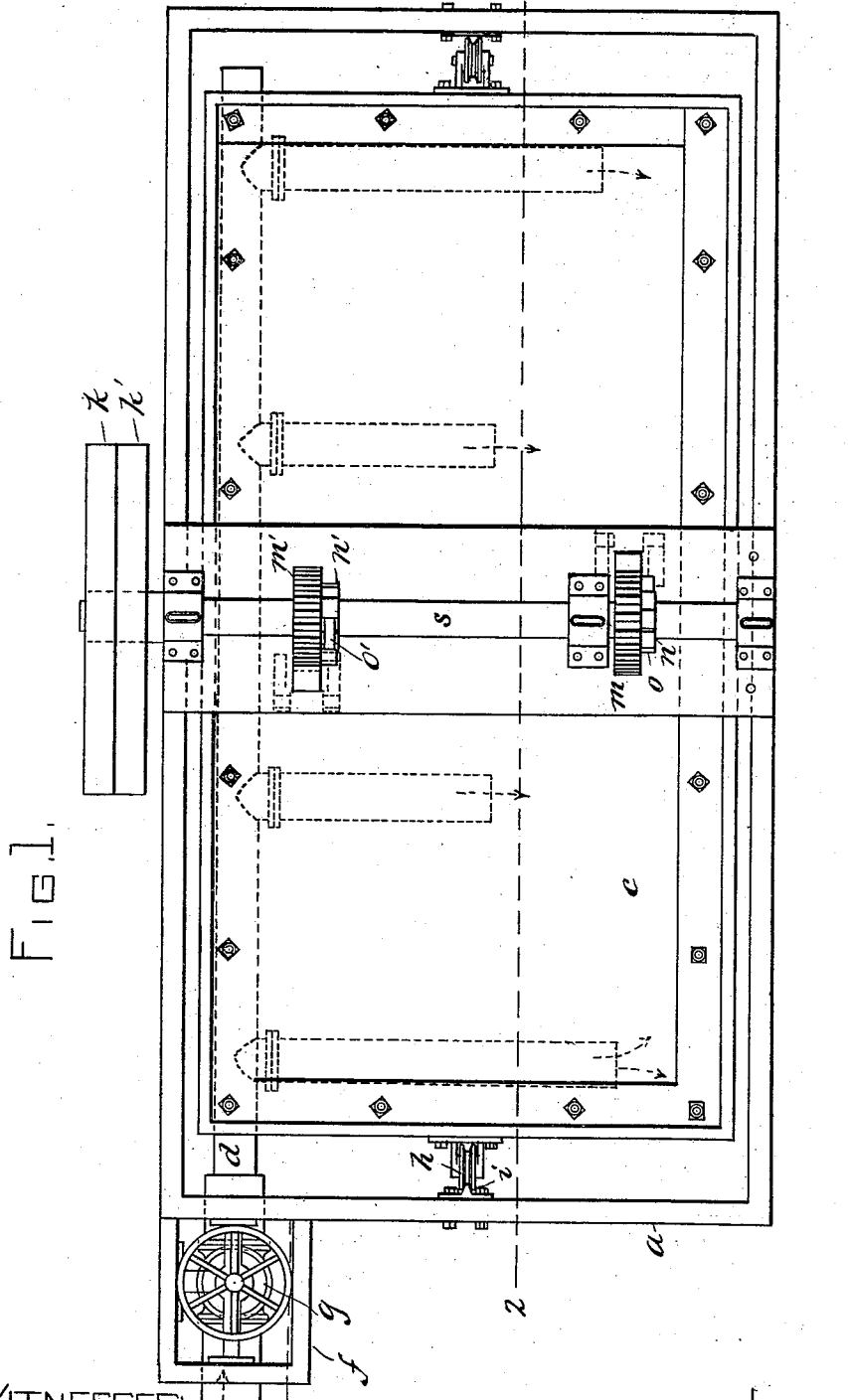

(No Model.) 2 Sheets—Sheet 1.

A. F. CHACE.
WATER MOTOR.

No. 416,667. Patented Dec. 3, 1889.

WITNESSES: INVENTOR:

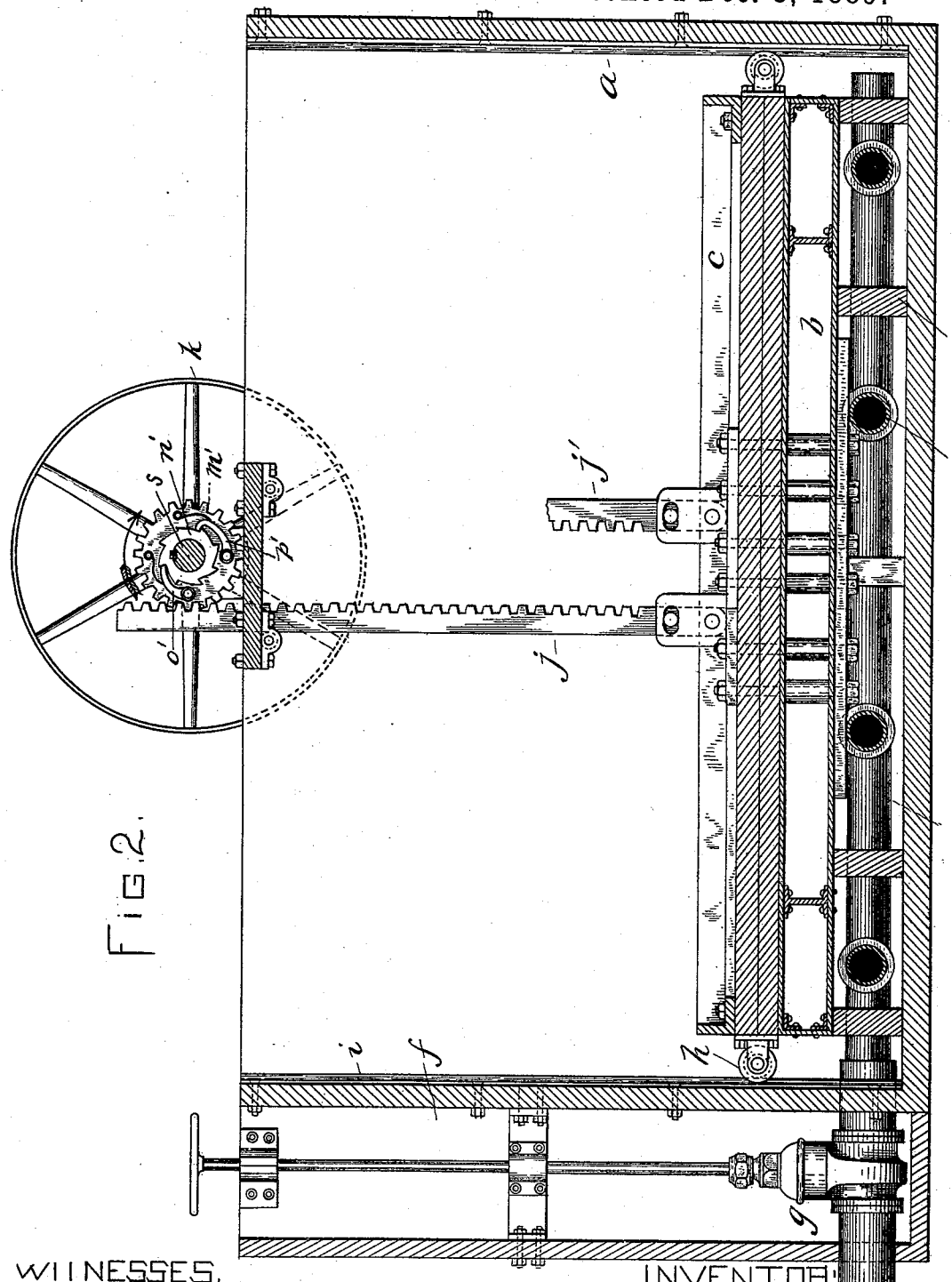

United States Patent Office.

ALBERT F. CHACE, OF BOSTON, MASSACHUSETTS, ASSIGNOR OF ONE-HALF, BY MESNE ASSIGNMENTS, TO LEE E. S. PERKINS AND EDWIN H. BUZZELL, BOTH OF SAME PLACE.

WATER-MOTOR.

SPECIFICATION forming part of Letters Patent No. 416,667, dated December 3, 1889.

Application filed April 9, 1889. Serial No. 306,525. (No model.)

*To all whom it may concern:*

Be it known that I, ALBERT F. CHACE, of Boston, in the county of Suffolk and State of Massachusetts, have invented certain new and useful Improvements in Water-Motors, of which the following is a specification.

My invention relates to motors adapted to be operated by the ebb and flow of water—as, for instance, by the tides of the ocean or by the rise and fall of water artificially occasioned.

It is the object of my invention to provide a motor of the nature mentioned, whereby the maximum buoyant force of the water employed may be utilized and the motor operated at a uniform rate of speed.

My invention consists of a motor comprising a chamber or tank, a float arranged in said chamber, a pipe communicating with said chamber, whereby water may be admitted thereto or discharged therefrom at a uniform rate, and a gate connected with said pipe, whereby the flow of water therethrough may be controlled.

The invention will first be fully described in connection with the accompanying drawings, forming a part of this specification, of which drawings—

Figure 1 is a top plan view of my invention. Fig. 2 is a longitudinal sectional view taken on line 2 2 of Fig. 1.

The same letters of reference designate the same parts or features, as the case may be, in both views.

In carrying out my invention I provide a substantial water-tight chamber or tank $a$, in which I place a float of such dimensions as that it may extend as near as may be practicable to the sides and ends of the chamber. This float I may construct with an air-tight compartment $b$ in its lower part and with a weight-box $c$ on its upper side, so that it may be buoyed or raised up as water is admitted to the tank $a$ and weighted to fall with the water as the latter flows out from the tank, the weighting of the float being varied in accordance with the quantity and consequent buoyant power of the water and the motive force required.

$d$ designates a pipe affording communication between the exterior and interior of the chamber $a$ at the lower part thereof, by which pipe water may be admitted to and discharged from the tank through the connecting branches $e$ at various points under the float, so that the latter in its rise and fall may be maintained to all intents and purposes in a level position.

At a convenient point either inside or outside of the chamber $a$ (in the present instance shown on the outside) I construct a well or small chamber $f$, communicating with the pipe $d$, connecting a gate $g$ with the pipe at this point, so that said gate may be readily operated without hinderance or obstruction from the water. It will be understood that the gate $g$ is of any character suited to opening or closing or partially closing the aperture in the pipe, so as to turn on or shut off the water or regulate the amount of flow in a given time therethrough.

Any suitable means may be provided for guiding the float in its rise and fall in the chamber $a$, that here shown being bowls or rollers $h$, connected with the float and having V-shaped grooves in their peripheries, which rollers are adapted to travel on V-shaped tracks $i$, connected with the chamber.

$j\ j'$ designate vertically-arranged rack-bars suitably connected at their lower ends with the float and guided in bearings connected with the tank, which rack-bars extend on opposite sides of horizontal rotary shaft $s$, arranged in suitable bearings on the top of the chamber $a$, the driving-pulleys $k\ k'$ being keyed on said shaft $s$.

$m\ m'$ designate gears turning loosely on the shaft $s$, the rack-bar $j$ engaging gear $m'$, and bar $j'$ engaging gear $m$.

$n\ n'$ designate ratchet-wheels keyed on shaft $s$, and $o\ o'$ are pawls pivoted, respectively, on the gears $m\ m'$ and engaging the respective ratchet-wheels $n\ n'$, holding-pawls $p\ p'$ being provided to prevent the turning of the ratchet-wheels $n\ n'$ in a direction opposite to that in which the pawls $o\ o'$ are adapted to rotate them.

With the construction and arrangement of parts thus far described it will be seen that by the raising of the float the shaft $s$ will be turned, through the medium of rack-bar $j$, gear $m'$, pawl $o'$, and ratchet-wheel $n'$, in the direction of the arrow, Fig. 2, turning driving-pulley $k$ in the same direction, pulley $k'$ remaining in a quiescent state, since gear $m$ will not be so moved as to render its attached pawl $o$ operative, and that when the float is lowered rack-bar $j'$ and its adjuncts will operate to rotate shaft $s$ and pulley $k'$ in the direction of the arrow, Fig. 2, the pulley $k$ remaining in a quiescent state. In this way, whether the float may rise or fall, one or the other of the driving-pulleys will be rotated as indicated by said arrow.

$q$ designates beams arranged on the bottom of the chamber $a$, upon which the float may rest when at its lowest position in the chamber, and by which said float may be kept from bearing upon the pipe $d$.

By this invention water may be admitted to and discharged from the tank at a uniform rate, and, as a consequence, operate the motor at a uniform rate of speed. For example, if the motor should be arranged to be actuated by the tides of the ocean, it can be adjusted so as to be operated at a regular uniform rate of speed, whether the ebb or flow of the tides shall be swift or slow.

In practice I close the gate $g$, so as to entirely stop the motor, when the water rises to its highest or nearly highest point in the chamber and when it is all or nearly all discharged from the chamber, opening said gate soon after the water changes from ebb to flow or flow to ebb, as the case may be, so as to avoid slow running of the motor at these times, and I have devised means to accomplish this opening and closing of the gate at the times mentioned automatically, though the means herein shown are adapted to be operated by hand only.

With my improved motor I am enabled to utilize the force of the tides of the ocean or the buoyant force of water whenever it can be supplied to fill and be discharged from the chamber $a$ in the operation of any kind or class of machinery or devices where a motor of any kind can be employed, the invention being particularly adapted to the operation of dynamo-electrical machines in charging storage-batteries and in operating other kinds of electrical machinery, running elevators and cars, loading and unloading vessels and railway-cars, &c.

It is obvious that the pipe $d$ may be provided with additional discharge branches $e$ or be supplied with fewer of such branches than is shown, and that said branches may terminate at any point under the float, as circumstances may suggest. It is also obvious that additional rack-bars $j j'$ and adjunctive devices may be supplied and that other changes may be made in the form and arrangement of parts constituting my invention; but such formal or mechanical changes will not be a material departure from the nature or spirit of my improvements.

Having thus explained the nature of my invention and the manner in which it may be used, I declare that what I claim is—

1. A water-motor consisting of a chamber or tank, a float in said tank adapted to rise and fall therein, and a pipe communicating between the interior and exterior of the tank and having its discharge end extended under said float, as set forth.

2. A water-motor consisting of a chamber or tank, a float in said tank adapted to rise and fall therein, and a pipe communicating between the interior and exterior of the tank, said pipe being provided with branch discharge-pipes extending to different points under the float, as set forth.

3. A water-motor consisting of a chamber or tank, a float in said tank adapted to rise and fall therein, a pipe communicating between the interior and exterior of the tank, a gate in said pipe, and a well connected with the tank and communicating with said gate, as set forth.

In testimony whereof I have signed my name to this specification, in the presence of two subscribing witnesses, this 5th day of April, A. D. 1889.

ALBERT F. CHACE.

Witnesses:
ARTHUR W. CROSSLEY,
W. C. RAMSAY.